United States Patent [19]

Condet

[11] Patent Number: 4,469,340
[45] Date of Patent: Sep. 4, 1984

[54] DEVICE FOR FIXING A TANK ON A SUPPORT STRUCTURE

[75] Inventor: Claude Condet, Montesson, France

[73] Assignee: Automobiles Peugeot/Automobiles Citroen, France

[21] Appl. No.: 419,315

[22] Filed: Sep. 17, 1982

[30] Foreign Application Priority Data

Oct. 16, 1981 [FR] France ............................. 81 19472

[51] Int. Cl.³ ............................................. B60K 15/02
[52] U.S. Cl. .................... 280/5 A; 248/311.2
[58] Field of Search ................ 248/1, 311.2, 201, 675, 248/229, 312.1, 313, 317, 318; 280/5 A, 5 R; 220/5 A, 69, 70; 24/543, 563

[56] References Cited

U.S. PATENT DOCUMENTS

| 3,023,468 | 3/1962 | Hord | 24/563 |
| 3,104,860 | 9/1963 | Brittain | 248/313 |
| 3,286,871 | 11/1966 | Eberline | 220/5 A |
| 3,452,957 | 7/1969 | Zuelsdorf | 248/318 |
| 3,833,054 | 3/1974 | Gross | 248/201 |
| 3,966,147 | 6/1976 | Wittko | 248/311.2 |
| 3,981,323 | 9/1976 | Watson | 280/5 A |
| 4,223,899 | 9/1980 | Krieger | 280/5 A |
| 4,346,865 | 8/1982 | Murata | 248/311.2 |
| 4,369,981 | 1/1983 | Chiba | 280/5 A |

FOREIGN PATENT DOCUMENTS 323106 12/1929 United Kingdom .

Primary Examiner—Reinaldo P. Machado
Assistant Examiner—Alvin Chin-Shue
Attorney, Agent, or Firm—Burns, Doane, Swecker & Mathis

[57] ABSTRACT

The tank (1) carries on one side ears (3) which are downwardly curved and, on the other side, planar perforated ears (5) on which are clipped tubular spacer members (19) of plastics material. Clipped on supports (9) of the supporting structure (10) are clips (7) of plastics material provided with an arcuate slot (6). In order to place the tank in position on the structure, it is presented at an angle so as to insert the curved ears in the correspondingly arcuate slots (6), then it is brought to its position of use with the spacer members then fitting on screws (16) rigid with the structure. The assembly is completed by the tightening of nuts (18) on these screws. Application in the fixing of fuel tanks of plastics material on automobile vehicles.

8 Claims, 4 Drawing Figures

DEVICE FOR FIXING A TANK ON A SUPPORT STRUCTURE

DESCRIPTION

The present invention relates to a device for fixing a tank on a support structure of the type comprising, on a first side of the tank, at least one first planar ear which is provided with an aperture for the passage of a screwthreaded element for holding the tank fast by bolting to the structure. It more particularly applies to the fixing of a fuel tank of synthetic material to the structure of an automobile vehicle.

The fixing on the structure of an automobile vehicle of a tank of synthetic material requires special precautions which result in considerable complications and a high cost relative to the fixing of a tank of sheet metal which is achieved merely by means of screws and nuts or V-sectioned elements (see the patent GB Pat. No. 323,106 which discloses an example of this aforementioned type of device).

An object of the invention is to overcome these drawbacks and to provide a particularly simple fixing device which is therefore easy to use and cheap and is applicable to the fixing of fuel tanks of synthetic material.

The invention provides a fixing device which comprises, on the opposite side of the tank, at least one second curved ear which has its concavity facing in the direction opposed to the structure and is received in an associated arcuate slot pertaining to a clip mounted on this structure.

One embodiment of the invention will be described in the ensuing description with reference to the accompanying drawings, in which.

Figure 2:
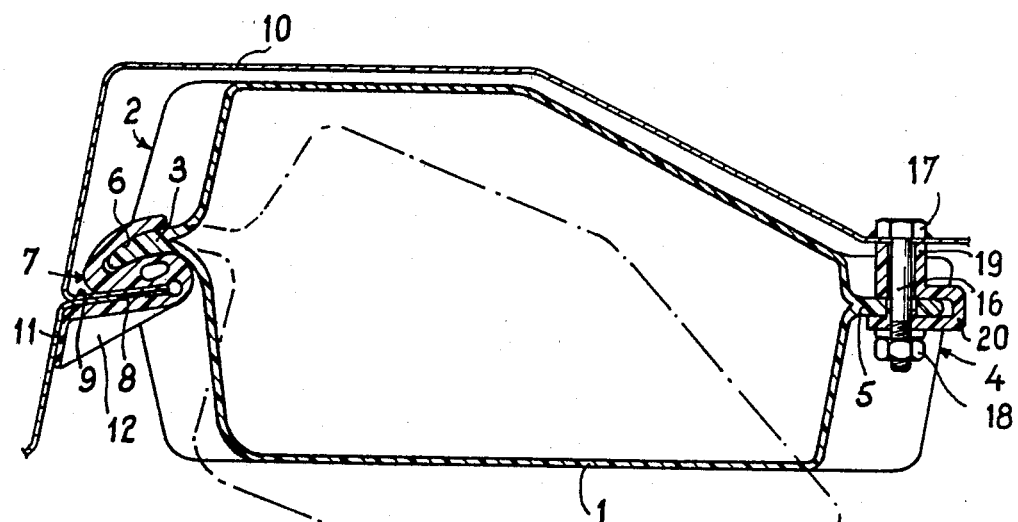
FIG. 2 is a sectional view taken on line 2—2 of FIG. 1.
Figure 1:
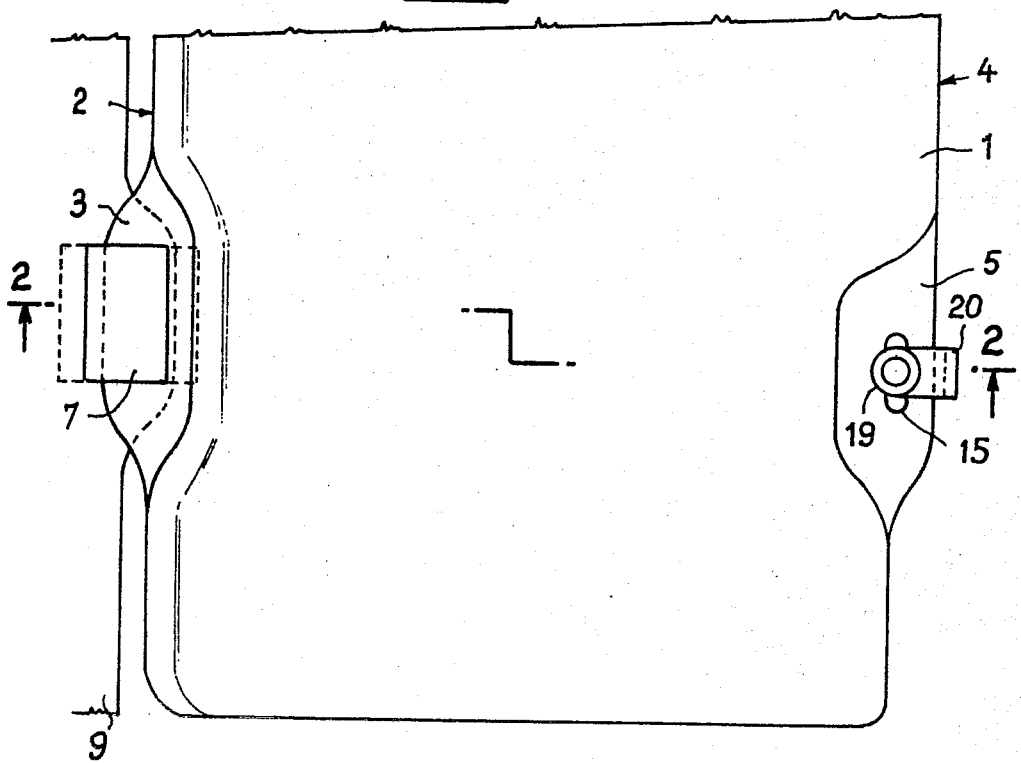
FIG. 1 is a partial plan view of a tank fixed in accordance with the invention.

The drawings show a fuel tank 1 of synthetic material, for example of high density polyethylene. On one of the sides of the tank, e.g. the side 2 facing the front of the vehicle, are formed ears 3 constituted by webs of curved shape with their concavity facing downwardly. On the opposite side 4 of the tank planar ears 5 are formed.

Each curved ear 3 is adapted to engage in a correspondingly arcuate slot 6 in a clip 7 of plastics material having a generally S shape. The clip thus comprises below the slot 6 a slot 8 whereby it can be clipped on a support 9 which is part of the metal structure 10 of the vehicle. The lower end portion of the S is downwardly extended by a flange 11 which is applied against the part of the structure 10 adjacent to the support 9. The L-shaped structure thus formed is reinforced by one or more vertical ribs 12.

Figure 3:
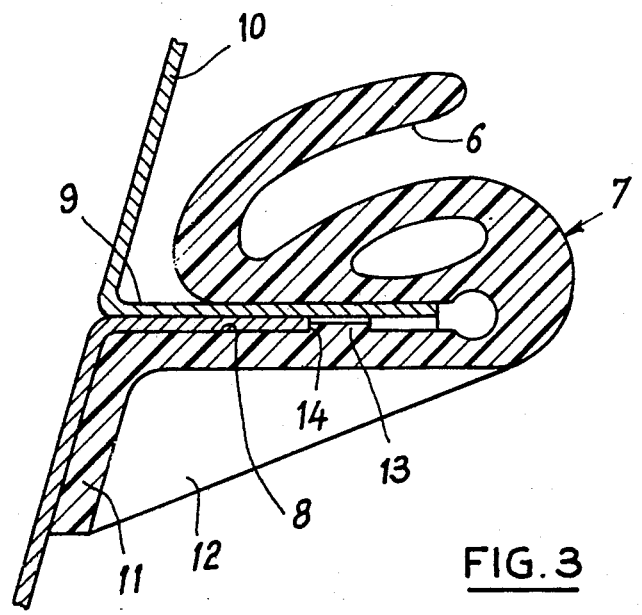
FIGS. 3 and 4 show, to an enlarged scale, details of FIG. 2.

The clip 7, shown to an enlarged scale in FIG. 3, can be made for example from polyamide. As illustrated, it preferably comprises, in the slot 8, a stud 13 adapted to engage in a conjugate aperture 14 of the support 9. This correctly positions the clip 7 and holds the latter stationary.

Each planar ear 5 comprises an oblong aperture 15 which is elongate in a direction parallel to the side 4 of the tank and is adapted to receive with clearance a vertical screw 16 which extends therethrough and projects downwardly from the structure 10. In the illustrated embodiment, the screw 16 is rendered rigid with the structure 10 by a welding of its head 17 to the structure 10 and the tank is fixed in respect of each ear 5 by a nut 18.

Figure 4:
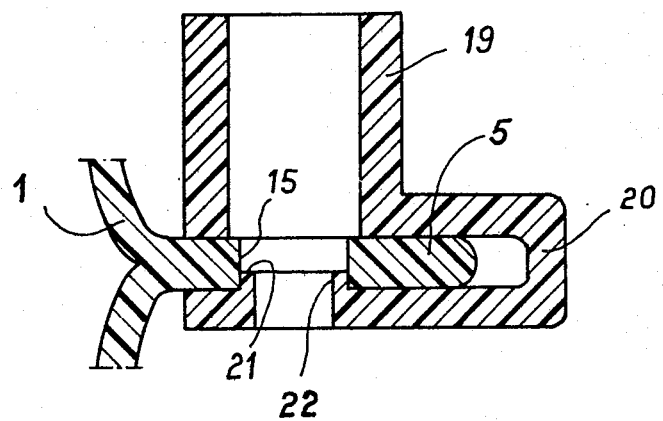

A tubular spacer member 19 is interposed between each ear 5 and the structure 10. Preferably, this spacer member, shown to an enlarged scale in FIG. 4, is integral with a U-shaped member 20 which is clipped on the ear 5 with engagement of a stud 21 in the oblong aperture 15 of the ear. The assembly comprising the spacer member and the U-shaped member may be made, for example, from polyamide. The stud 21 is provided with a circular central aperture 22 whose diameter corresponds roughly to the diameter of the screw 16.

The tank is mounted in the downwardly open cavity defined by the structure 10 between the support 9 and the screw 16 in a particularly simple manner:

First of all, the clips 7 are clipped in position on the support 9 and the spacer members 19 are placed in position on the planar ears 5. The tank is then presented in the downwardly inclined position indicated in dot-dash lines in FIG. 2, and the curved ears 3 are made to slide to the end of the slots 6 of the clips 7 as the tank is gradually raised to its final position. When the tank has almost reached its horizontal position of use, the spacer members 19 are fitted on the screws 16 until they abut against the structure 10, the screws 16 then extending below the U-shaped members 20. It is then merely necessary to place the nuts 18 in position and to tighten them to perfectly hold the tank in position on the structure of the vehicle. The tank is disassembled just as easily by reversing the order of the aforementioned operations.

The arrangement just described is particularly simple and cheap. Moreover, the tank 1 is perfectly held in position with no contact with the metal parts of the structure 10. In this way, there is no risk of deterioration by friction between the metal of the structure and the plastics material of the tank and there is a heat insulation between the structure and the tank which delays the heating of the latter in the event of the vehicle catching fire.

Having now described my invention what I claim as new and desire to secure by Letters Patent is:

1. A device for fixing a tank to a supporting structure and in particular a fuel tank on the structure of an automobile vehicle, said device comprising, on a first side of the tank, a substantially planar ear which defines an aperture for receiving a screwthreaded element for holding the tank fast to the structure, the device further comprising, on a second side of the tank opposed to said first side, a substantially curved ear which has a concavity facing away from the structure, and a clip mounted on said structure and defining an arcuate slot substantially conforming to said curved ear, the curved ear being slidably received in said arcuate slot.

2. A device according to claim 1, wherein the clip is in clipped relation to a support which is part of the structure.

3. A device according to claim 1 or 2, wherein the aperture of the substantially planar ear is elongated in a direction parallel to said first side of the tank.

4. A device according to claim 1 or 2, wherein a spacer member is interposed between the structure and the substantially planar ear.

5. A device according to claim 4, comprising a U-shaped member which is clipped on the substantially planar ear and is rigid with the spacer member, the screwthreaded element extending without clearance through the spacer member.

6. A device according to claim 4, wherein the spacer member is of plastics material.

7. A device according to claim 5, wherein the spacer member is of plastics material.

8. A device according to claim 1 or 2, wherein the clip is of plastics material.

* * * * *